United States Patent
Yang et al.

(10) Patent No.: US 9,237,304 B2
(45) Date of Patent: Jan. 12, 2016

(54) MULTI-CHANNEL SHARING APPARATUS AND MULTI-CHANNEL SHARING METHOD

(71) Applicant: Quanta Computer Inc., Tao Yuan Shien (TW)

(72) Inventors: Wen-Chu Yang, New Taipei (TW); Wei-Min Chao, Taoyuan County (TW); Yi-Sheng Yu, Taoyuan County (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 29 days.

(21) Appl. No.: 14/279,698

(22) Filed: May 16, 2014

(65) Prior Publication Data

US 2015/0244982 A1    Aug. 27, 2015

(30) Foreign Application Priority Data

Feb. 24, 2014  (TW) .............................. 103105999 A

(51) Int. Cl.
*H04N 7/15* (2006.01)
*H04N 7/14* (2006.01)
*H04L 29/06* (2006.01)

(52) U.S. Cl.
CPC ............ *H04N 7/147* (2013.01); *H04L 65/1059* (2013.01)

(58) Field of Classification Search
CPC ......... H04N 7/14; H04N 7/141; H04N 7/142; H04N 21/4788; H04N 21/41407
USPC ........................................... 348/14.01–14.16
See application file for complete search history.

(56) References Cited

U.S. PATENT DOCUMENTS

| 5,990,932 | A | * | 11/1999 | Bee ........................ | H04N 7/142 |
| | | | | | 348/14.03 |
| 2009/0086011 | A1 | * | 4/2009 | Ek ...................... | H04N 1/00347 |
| | | | | | 348/14.02 |
| 2010/0085418 | A1 | * | 4/2010 | Sampsel et al. ............ | 348/14.08 |
| 2013/0050394 | A1 | * | 2/2013 | Zhou ......................... | 348/14.02 |
| 2014/0240319 | A1 | * | 8/2014 | Syed ............................ | 345/428 |

FOREIGN PATENT DOCUMENTS

| TW | M348034 U | 1/2009 |
| TW | 201310968 A | 3/2013 |
| TW | M452336 U | 5/2013 |

OTHER PUBLICATIONS

Taiwanese Office Action dated May 5, 2015.

* cited by examiner

*Primary Examiner* — Melur Ramakrishnaiah
(74) *Attorney, Agent, or Firm* — Rabin & Berdo, P.C.

(57) ABSTRACT

A multi-channel sharing apparatus and a multi-channel sharing method are disclosed. The multi-channel sharing apparatus comprises a companion chip and an application processor. The companion chip comprises a first compression circuit, a second compression circuit and a transmission circuit. The application processor comprises a receiving circuit and a network module. The first compression circuit generates a first bit stream and a second bit stream according to the first channel data. The second compression circuit generates a third bit stream and a fourth bit stream according to the second channel data. The transmission circuit transmits the first, second, third and fourth bit streams. The receiving circuit receives the first, second, third and fourth bit streams. The network module outputs the first network package according to the second bit stream, and outputs the second network package according to the fourth bit stream.

23 Claims, 6 Drawing Sheets

1

MULTI-CHANNEL SHARING APPARATUS AND MULTI-CHANNEL SHARING METHOD

This application claims the benefit of Taiwan application Serial No. 103105999, filed Feb. 24, 2014, the subject matter of which is incorporated herein by reference.

BACKGROUND OF THE INVENTION

1. Field of the Invention

The invention relates in general to an electronic apparatus, and more particularly to a multi-channel sharing apparatus and a multi-channel sharing method.

2. Description of the Related Art

As mobile apparatus has gained great popularity nowadays, the need for the sharing between a local screen and a video call is increasing. Most of PCs and notebook computers are equipped with a webcam, and mobile phones and tablet PCs are already equipped with front and rear dual cameras. Currently, all of PCs, notebook computers, mobile phones and tablet PCs can only be used in sharing uni-channel audio/video data, and cannot be used in sharing multi-channel audio/video data in a real-time manner. If a user wants to share multi-channel audio/video data, the user has to manually select which channel to share. Let the PC and the notebook computer be taken for example. The user can manually select to share a local screen or a frame captured by a webcam to a remote user. Let the mobile phone and the tablet PC be taken for example. The user can manually select to share a frame captured by a front camera or a back camera to a remote user. However, such operation is indeed very inconvenient to the user. For example, when a doctor of a clinic located in a remote and secluded mountain area is conducting a medical video consultation with a doctor of a large teaching hospital in a remote end, the back camera of the clinic computer is focused on the patient's wound, the front camera of the clinic computer is focused on the clinic doctor or the medical history held at the clinic doctor's hand, and real-time data such as heart beat/blood pressure/oxygen concentration can be displayed on the screen of the clinic computer. The high-resolution, real-time tri-channel multi-media data provided by the front camera, the back camera and the screen are very important. The doctor of the teaching hospital at the remote end has to tell the clinic staff which channel to switch to, then the clinic staff will manually and repetitively switch among the three channels. However, such operation is very inconvenient to the doctor of the teaching hospital conducting a medical video consultation.

SUMMARY OF THE INVENTION

The invention is directed to a multi-channel sharing apparatus capable of sharing multi-the channel data to a remote user in a real-time manner.

According to one embodiment the present invention, a multi-channel sharing apparatus is disclosed. The multi-channel sharing apparatus comprises a companion chip and an application processor. The companion chip comprises a first compression circuit, a second compression circuit and a transmission circuit. The application processor comprises a receiving circuit and a network module. The first compression circuit generates a first bit stream and a second bit stream according to the first channel data. The resolution of the second bit stream is higher than that of the first bit stream. The second compression circuit generates a third bit stream and a fourth bit stream according to the second channel data. The resolution of the fourth bit stream is higher than that of the third bit stream. The transmission circuit transmits the first bit stream, the second bit stream, the third bit stream and the fourth bit stream. The receiving circuit receives the first bit stream, the second bit stream, the third bit stream and the fourth bit stream. The network module outputs the first network package according to the second bit stream, and outputs the second network package according to the fourth bit stream.

According to another embodiment the present invention, a multi-channel sharing method is disclosed. The multi-channel sharing method comprises following steps. Firstly, a first bit stream and a second bit stream are generated according to a first channel data, and a third bit stream and a fourth bit stream are synchronically generated according to a second channel data, wherein the resolution of the second bit stream is higher than that of the first bit stream, and the resolution of the fourth bit stream is higher than that of the third bit stream. Then, a first network package is outputted according to the second bit stream, and a second network package is synchronically outputted according to the fourth bit stream.

The above and other aspects of the invention will become better understood with regard to the following detailed description of the preferred but non-limiting embodiment (s). The following description is made with reference to the accompanying drawings.

DETAILED DESCRIPTION OF THE INVENTION

First Embodiment

Figure 1:
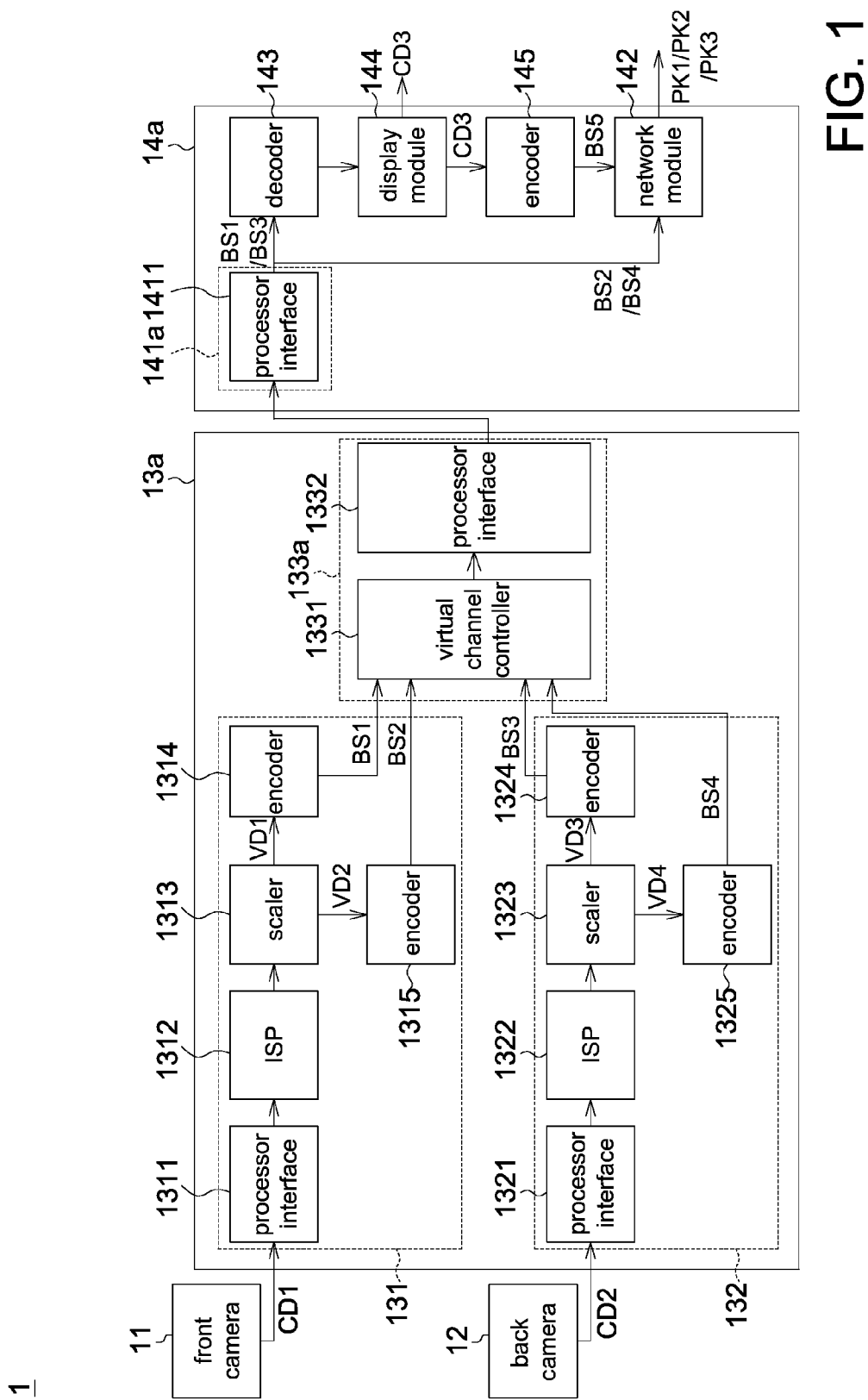
FIG. 1 is a block diagram of a multi-channel sharing apparatus according to a first embodiment.

Referring to FIG. 1, a block diagram of a multi-channel sharing apparatus according to a first embodiment is shown. The multi-channel sharing apparatus 1, which can be realized by such as a mobile phone, a tablet PC, a notebook or a PC, comprises a front camera 11, a back camera 12, a companion chip 13a and an application processor 14a. The front camera 11 provides a channel data CD1, and the back camera 12 provides a channel data CD2. The companion chip 13a comprises a compression circuit 131, a compression circuit 132 and a transmission circuit 133a. The compression circuit 131 generates a bit stream BS1 and a bit stream BS2 according to the channel data CD1, wherein the resolution of the bit stream BS2 is higher than that of the bit stream BS1. The compression circuit 132 generates a bit stream BS3 and a bit stream BS4 according to the channel data CD2, wherein the resolution of the bit stream BS4 is higher than that of the bit stream BS3. The transmission circuit 133a transmits the bit stream BS1, the bit stream BS2, the bit stream BS3 and the bit stream BS4.

The application processor 14a comprises a receiving circuit 141a, a network module 142, a decoder 143, a display module 144 and an encoder 145. The decoder 143 can be realized by a JPEG the decoder, and the encoder 145 can be realized by an H.26x/VPx encoder. The H.26x encoder can be realized by an H.264 or H.265 encoder, and the VPx encoder can be realized by a VP7, VP8 or VP9 encoder. The receiving circuit 141*a* receives the bit stream BS1, the bit stream BS2, the bit stream BS3 and the bit stream BS4 from the transmission circuit 133*a*. The network module 142 can be realized by an Ethernet module. The network module 142 outputs a network package PK1 according to the bit stream BS2, and outputs a network package PK2 according to the bit stream BS4. The display module 144 outputs a channel data CD3 to the screen. The encoder 145 encodes the channel data CD3 displayed on the screen as a bit stream BS5. The network module 142 further outputs a network package PK3 according to the bit stream BS5. A remote user can obtain the channel data CD1, the channel data CD2 and the channel data CD3 in a real-time manner by receiving the network package PK1, the network package PK2 and the network package PK3.

The network module 142 can further assign different identification codes to the network package PK1, the network package PK2 and the network package PK3 for identifying respective sources of channel data. Besides, the channel data CD3 outputted to the screen by the display module 144 can be obtained by decoding the bit stream BS1 or the bit stream BS3 by the decoder 143. After the decoder 143 decoded the bit stream BS1 or the bit stream BS3 as the channel data CD3, the display module 144 outputs the channel data CD3 to the screen, so that the user can preview an image captured by the front camera 11 or the back camera 12 on the screen.

Furthermore, the compression circuit 131 comprises a processor interface 1311, an image signal processor (ISP) 1312, a scaler 1313, an encoder 1314 and an encoder 1315. The processor interface 1311 can be realized by a parallel interface or a mobile industry processor interface (MIPI) camera serial interface (CSI) such as MIPI CSI-2. The encoder 1314 can be realized by a JPEG encoder, and the encoder 1315 can be realized by an H.26x/VPx encoder. The H.26x encoder can be realized by an H.264 or an H.265 encoder, and the VPx encoder can be realized by a VP7, VP8 or VP9 encoder. The ISP 1312 receives the channel data CD1 via the processor interface 1311. The scaler 1313 outputs a video data VD1 and a video data VD2 according to the channel data CD1. The resolution of the video data VD2 is higher than that of the video data VD1. The encoder 1314 encodes the video data VD1 as the bit stream BS1, and outputs the bit stream BS1 to the transmission interface 133*a*. The encoder 1315 encodes the video data VD2 as the bit stream BS2, and outputs the bit stream BS2 to the transmission interface 133*a*.

The compression circuit 132 comprises a processor interface 1321, an ISP 1322, a scaler 1323, an encoder 1324 and an encoder 1325. The processor interface 1321 can be realized by a parallel interface or an MIPI CSI such as MIPI CSI-2. The encoder 1324 can be realized by a JPEG encoder, and the encoder 1325 can be realized by an H.26x/VPx encoder. The H.26x encoder can be realized by an H.264 or H.265 encoder, and the VPx encoder can be realized by a VP7, VP8 or VP9 encoder. The ISP 1322 receives the channel data CD2 via processor interface 1321. The scaler 1323 outputs the video data VD3 and the video data VD4 according to the channel data CD2. The resolution of the video data VD4 is higher than that of the video data VD3. The encoder 1324 encodes the video data VD3 as the bit stream BS3, and outputs the bit stream BS3 to the transmission interface 133*a*. The encoder 1325 encodes the video data VD4 as the bit stream BS4, and outputs the bit stream BS4 to the transmission interface 133*a*.

The transmission circuit 133*a* comprises a virtual channel controller 1331 and a processor interface 1332. The virtual channel controller 1331 comprises a plurality of virtual channels via which the bit stream BS1, the bit stream BS2, the bit stream BS3 and the bit stream BS4 are transmitted to the receiving circuit 141*a*. The receiving circuit 141*a* comprises a processor interface 1411, which can be realized by an MIPI CSI such as MIPI CSI-2. The processor interface 1411 receives the bit stream BS1, the bit stream BS2, the bit stream BS3 and the bit stream BS4. The processor interface 1411 outputs the bit stream BS1 and the bit stream BS3 to the decoder 143, and outputs the bit stream BS2 and the bit stream BS4 to the network module 142.

The multi-channel sharing method, can be used in the multi-channel sharing apparatus 1, comprises following steps. Firstly, the companion chip 13*a* generates a bit stream BS1 and a bit stream BS2 according to a channel data CD1, and synchronically generates a bit stream BS3 and a bit stream BS4 according to a channel data CD2. Then, the application processor 14*a* outputs a network package PK1 according to the bit stream BS2, and synchronically outputs a network package PK2 according to the bit stream BS4. Thus, several channel data can be shared to a remote device in a real-time manner.

Second Embodiment

Figure 2:
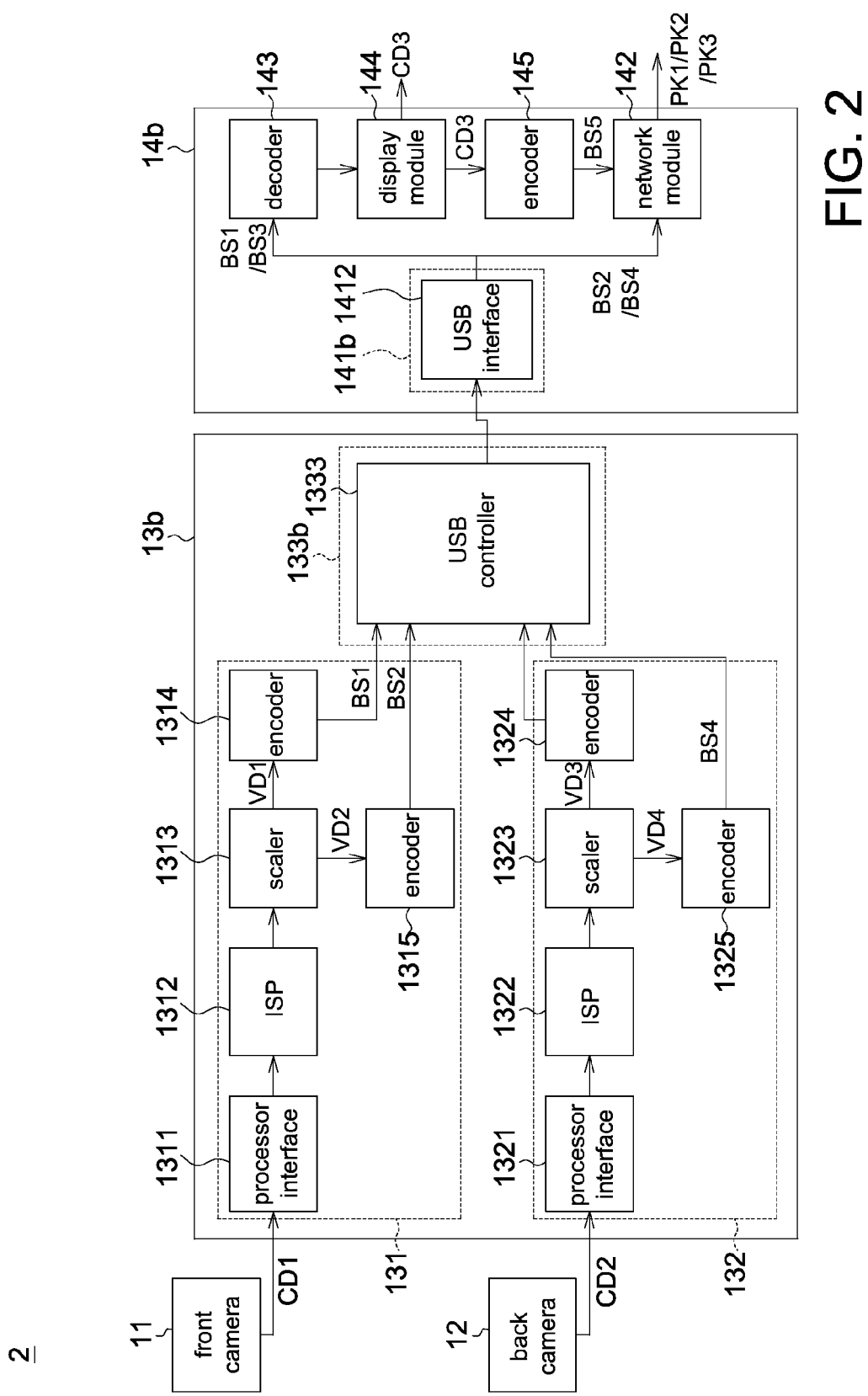
FIG. 2 is a block diagram of a multi-channel sharing apparatus according to a second embodiment.

Referring to FIG. 2, a block diagram of a multi-channel sharing apparatus according to a second embodiment is shown. The second embodiment is different from the first embodiment mainly in that the transmission circuit 133*b* of the companion chip 13*b* of the multi-channel sharing apparatus 2 comprises a universal serial bus (USB) controller 1333, and the receiving circuit 141*b* of the application processor 14*b* comprises a USB interface 1412. The USB protocol is such as USB 2.0, USB 3.0 or USB 3.1. The USB controller 1333 can transmit the bit stream BS1, the bit stream BS2, the bit stream BS3 and the bit stream BS4 to the USB interface 1412 through different endpoint addresses. The USB interface 1412 outputs the bit stream BS1 and the bit stream BS3 to the decoder 143, and outputs the bit stream BS2 and the bit stream BS4 to the network module 142.

Third Embodiment

Figure 3:
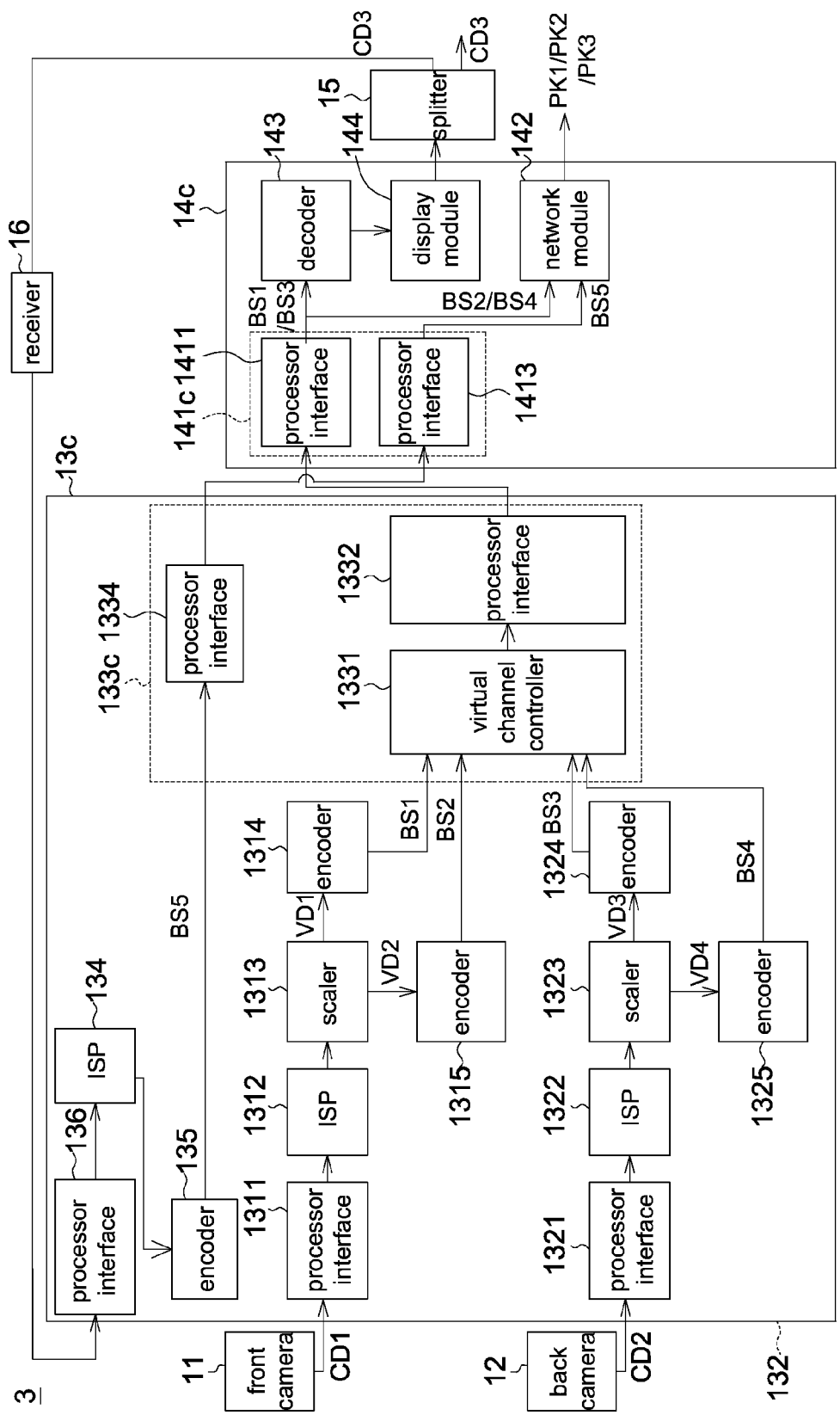
FIG. 3 is a block diagram of a multi-channel sharing apparatus according to a third embodiment.

Referring to FIG. 3, a block diagram of a multi-channel sharing apparatus according to a third embodiment is shown. The third embodiment is different from the first embodiment mainly in that the multi-channel sharing apparatus 3 further comprises a splitter 15 and a receiver 16, and the companion chip 13*c* further comprises an ISP 134 and an encoder 135. The transmission circuit 133*c* of the companion chip 13*c* further comprises a processor interface 1334 in addition to the virtual channel controller 1331 and the processor interface 1332. The receiving circuit 141*c* of the application processor 14*c* further comprises a processor interface 1413 in addition to the processor interface 1411. The splitter 15 distributes the channel data CD3 to the screen and the receiver 16.

The receiver 16 converts the channel data CD3, which has been distributed by the splitter 15, into a digital parallel data or an MIPI signal, and further outputs the digital parallel data or MIPI signal to the processor interface 136 of the companion chip 13*c*. The ISP 134 receives the channel data CD3 via the processor interface 136. The channel data CD3 is image processed and outputted to the encoder 135. The encoder 135 encodes the channel data CD3 received by the ISP 134 as a fifth bit stream BS5. The processor interface 1334 transmits the bit stream BS5 to the processor interface 1413. After the processor interface 1413 received the bit stream BS5, the processor interface 1413 outputs the bit stream BS5 to the network module 142. The network module 142 generates a network package PK3 according to the bit stream BS5.

The display interface of the multi-channel sharing apparatus 3 is a high-definition multimedia interface (HDMI). The splitter 15 can be realized by an HDMI splitter, and the receiver 16 can be realized by an HDMI receiver. The encoder 135 can be realized by an H.26x/VPx encoder. The H.26x encoder can be realized by an H.264, H.265 encoder, and the VPx encoder can be realized by a VP8 or VP9 encoder. The processor interface 1334 and the processor interface 1413 both can be realized by an MIPI CSI, such as MIPI CSI-2. In short, the multi-channel sharing apparatus 3 uses the splitter 15 and the receiver 16 to form a feedback path between the companion chip 13c and the application processor 14c, and further uses the companion chip 13c to compress the channel data CD3.

Fourth Embodiment

Figure 4:
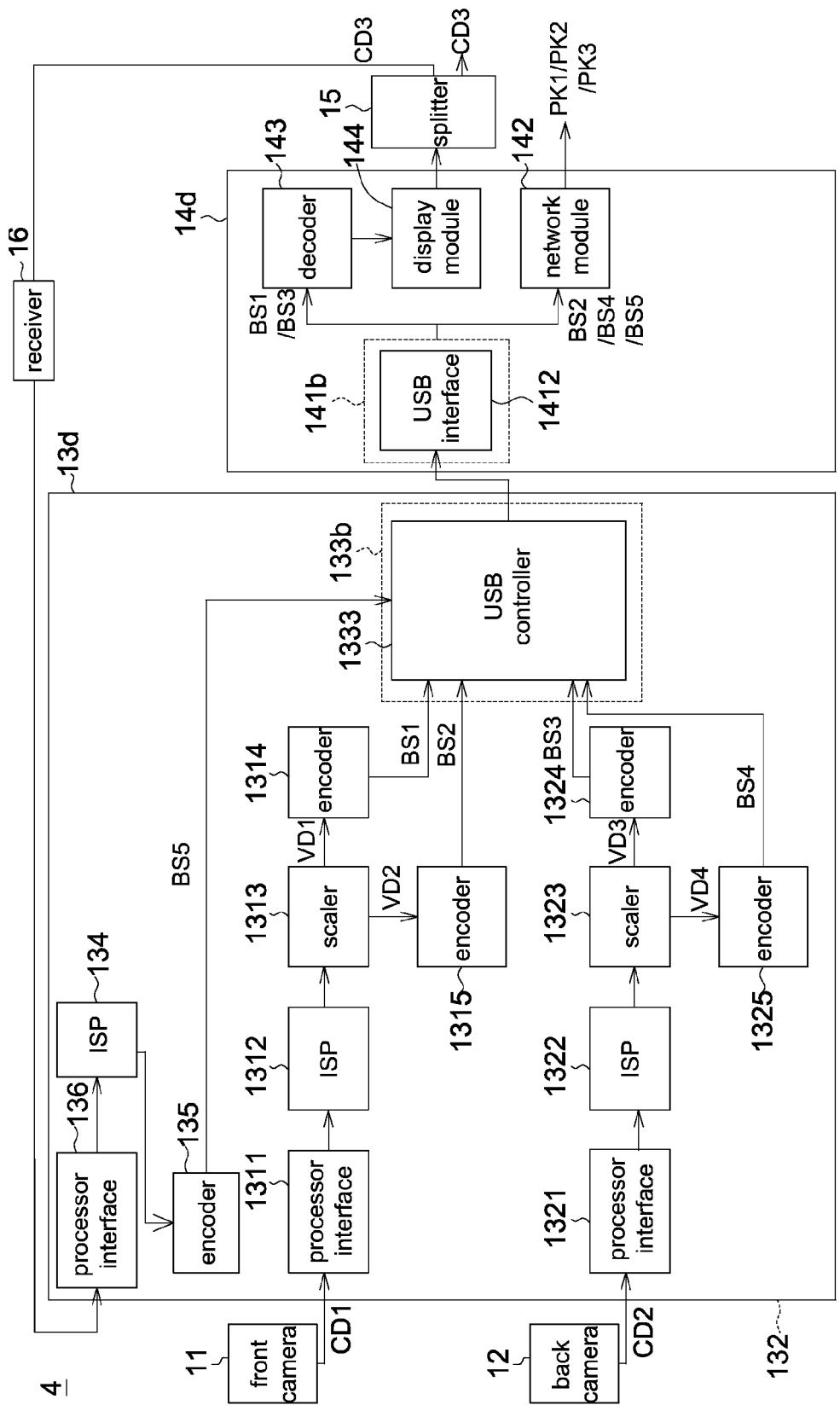
FIG. 4 is a block diagram of a multi-channel sharing apparatus according to a fourth embodiment.

Referring to FIG. 4, a block diagram of a multi-channel sharing apparatus according to a fourth embodiment is shown. The fourth embodiment is different from the third embodiment mainly in that the transmission circuit 133b of the companion chip 13d of the multi-channel sharing apparatus 4 comprises a universal serial bus (USB) controller 1333, and the receiving circuit 141b of the application processor 14d comprises a USB interface 1412. The USB protocol is such as USB 2.0, USB 3.0 or USB 3.1. The USB controller 1333 can transmit the bit stream BS1, the bit stream BS2, the bit stream BS3, the bit stream BS4 and the bit stream BS5 to the USB interface 1412 through different endpoint addresses. The USB interface 1412 outputs the bit stream BS1 and the bit stream BS3 to the decoder 143, and outputs the bit stream BS2, the bit stream BS4 and the bit stream BS5 to the network module 142.

Fifth Embodiment

Figure 5:
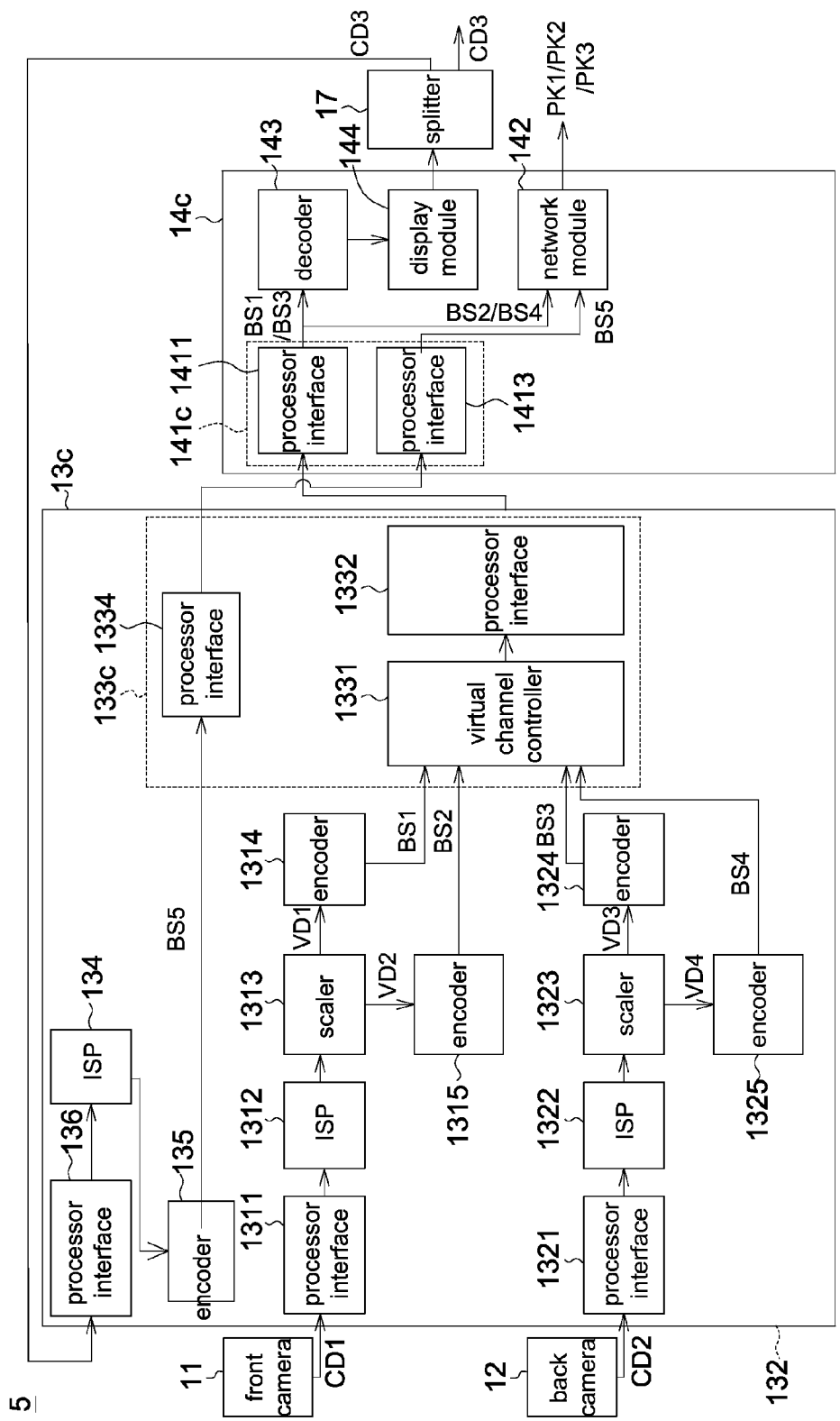
FIG. 5 is a block diagram of a multi-channel sharing apparatus according to a fifth embodiment.

Referring to FIG. 3 and FIG. 5, a block diagram of a multi-channel sharing apparatus according to a fifth embodiment is shown. The fifth embodiment is different from the third embodiment mainly in that the multi-channel sharing apparatus 5 does not comprise the receiver 16, and the display interface of the multi-channel sharing apparatus 5 is an MIPI display serial interface (DSI). The splitter 17 can be realized by an MIPI DSI splitter. The splitter 17 distributes the channel data CD3 to the screen and the companion chip 13c. It should be noted that when the application processor 14c supports the output of two MIPI DSIs, the splitter 17 can be omitted, and the display module 144 is directly connected to the processor interface 136 of the companion chip 13c.

Sixth Embodiment

Figure 6:
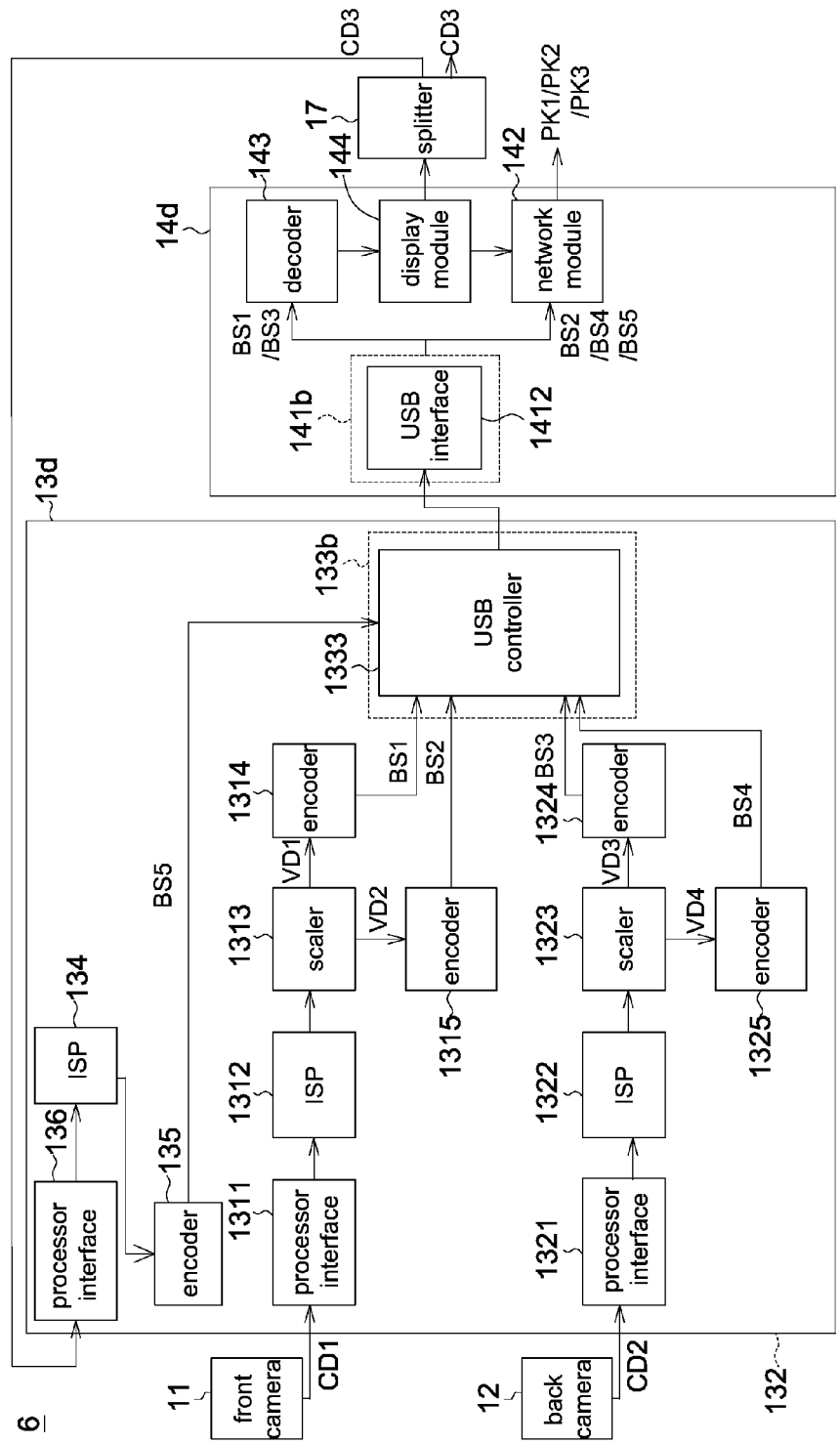
FIG. 6 is a block diagram of a multi-channel sharing apparatus according to a sixth embodiment.

Referring to FIG. 6, a block diagram of a multi-channel sharing apparatus according to a sixth embodiment is shown. The sixth embodiment is different from the fifth embodiment mainly in that the transmission circuit 133b of the companion chip 13d of the multi-channel sharing apparatus 4 comprises a universal serial bus (USB) controller 1333, and the receiving circuit 141b of the application processor 14d comprises a USB interface 1412. The USB protocol is such as USB 2.0, USB 3.0 or USB 3.1. The USB controller 1333 can transmit the bit stream BS1, the bit stream BS2, the bit stream BS3, the bit stream BS4 and the bit stream BS5 to the USB interface 1412 through different endpoint addresses. The USB interface 1412 outputs the bit stream BS1 and the bit stream BS3 to the decoder 143, and outputs the bit stream BS2, the bit stream BS4 and the bit stream BS5 to the network module 142.

The multi-channel sharing apparatus disclosed in above embodiments is not limited to sharing tri-channel multi-media data in a real-time manner, and is also capable of sharing the multi-media data of two channels or more than three channels in a real-time manner. The multi-channel sharing apparatus disclosed in above embodiments is capable of sharing multi-channel data to a remote device in a real-time manner, so that the user of a remote device can receive the multi-channel multi-media data in a real-time manner, largely increasing the convenience of use. For example, when a doctor of a clinic located in a secluded and remote mountain area is conducting a medical video consultation with a doctor of a large teaching hospital, the back camera of the clinic computer is focused on the patient's wound, the front camera of the clinic computer is focused on the clinic doctor or the medical history held at the clinic doctor's hand, and real-time data such as heart beat/blood pressure/oxygen concentration can be displayed on the screen of the clinic computer. The real-time tri-channel multi-media data provided by the front camera, the back camera and the screen are very important. The doctor of the teaching hospital at the remote end can make correct judgment based on the three-channel multi-media data received in a real-time manner. The doctor of the teaching hospital at the remote end can view the tri-channel multi-media data displayed on several screens. Or, the doctor of the teaching hospital at the remote end can view the tri-channel multi-media data by switching the frames of the tri-channel multi-media data without waiting for the clinic staff to switch the channels.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-channel sharing apparatus, comprising:
    a companion chip, comprising:
        a first compression circuit for generating a first bit stream and a second bit stream according to a first channel data, wherein the resolution of the second bit stream is higher than that of the first bit stream; and
        a second compression circuit for generating a third bit stream and a fourth bit stream according to a second channel data, wherein the resolution of the fourth bit stream is higher than that of the third bit stream;
    a transmission circuit for transmitting the first bit stream, the second bit stream, the third bit stream and the fourth bit stream; and,
    an application processor, comprising:
        a receiving circuit for receiving the first bit stream, the second bit stream, the third bit stream and the fourth bit stream; and
        a network module for outputting a first network package according to the second bit stream, and outputting a second network package according to the fourth bit stream.

2. The multi-channel sharing apparatus according to claim 1, wherein the application processor further comprises:

a display module for outputting a third channel data to a screen; and
a decoder for decoding the first bit stream or the third bit stream as the third channel data.

3. The multi-channel sharing apparatus according to claim 2, wherein the first compression circuit comprises:
a first processor interface;
a first image signal processor (ISP) for receiving the first channel data via the first processor interface;
a first scaler for outputting a first video data and a second video data according to the first channel data, wherein the resolution of the second video data is higher than that of the first video data;
a first encoder for encoding the first video data as the first bit stream; and
a second encoder for encoding the second video data as the second bit stream.

4. The multi-channel sharing apparatus according to claim 3, wherein the second compression circuit comprises:
a second processor interface;
a second image signal processor (ISP) for receiving the second channel data via the second processor interface;
a second scaler for outputting a third video data and a fourth video data according to the second channel data, wherein the resolution of the fourth video data is higher than that of the third video data;
a third encoder for encoding the third video data as the third bit stream; and
a fourth encoder for encoding the fourth video data as the fourth bit stream.

5. The multi-channel sharing apparatus according to claim 4, wherein the application processor further comprises:
a fifth encoder for encoding the third channel data as a fifth bit stream;
wherein, the network module further outputs a third network package according to the fifth bit stream.

6. The multi-channel sharing apparatus according to claim 5, wherein the transmission circuit comprises:
a third processor interface for transmitting the first bit stream, the second bit stream, the third bit stream and the fourth bit stream to the receiving circuit; and
a virtual channel controller, comprising:
a plurality of virtual channels via which the first bit stream, the second bit stream, the third bit stream and the fourth bit stream are transmitted to the third processor interface.

7. The multi-channel sharing apparatus according to claim 6, wherein the receiving circuit further comprises:
a fourth processor interface for receiving the first bit stream, the second bit stream, the third bit stream and the fourth bit stream.

8. The multi-channel sharing apparatus according to claim 5, wherein the transmission circuit further comprises:
a universal serial bus (USB) controller for transmitting the first bit stream, the second bit stream, the third bit stream and the fourth bit stream.

9. The multi-channel sharing apparatus according to claim 8, wherein the receiving circuit further comprises:
a USB interface for receiving the first bit stream, the second bit stream, the third bit stream and the fourth bit stream.

10. The multi-channel sharing apparatus according to claim 4, further comprising:
a splitter; and
a receiver for converting the third channel data, which has been distributed by the splitter, into a digital parallel or an MIPI signal and outputting the digital parallel data or the MIPI signal to the companion chip.

11. The multi-channel sharing apparatus according to claim 10, wherein the companion chip further comprises a fifth processor interface, a third ISP and a fifth encoder, the third signal processor receives the third channel data via the fifth processor interface, the fifth encoder encodes the third channel data, which has been image processed by the third signal processor, as a fifth bit stream.

12. The multi-channel sharing apparatus according to claim 11, wherein the transmission circuit comprises:
a third processor interface for transmitting the first bit stream, the second bit stream, the third bit stream and the fourth bit stream;
a fourth processor interface for transmitting the fifth bit stream; and
a virtual channel controller, comprising:
a plurality of virtual channels via which the first bit stream, the second bit stream, the third bit stream and the fourth bit stream are transmitted to the third processor interface.

13. The multi-channel sharing apparatus according to claim 12, wherein the receiving circuit comprises:
a sixth processor interface for receiving the first bit stream, the second bit stream, the third bit stream and the fourth bit stream; and
a seventh processor interface for receiving the fifth bit stream, wherein the network module outputs the third network package according to the fifth bit stream.

14. The multi-channel sharing apparatus according to claim 11, wherein the transmission circuit further comprises:
a universal serial bus (USB) controller for transmitting the first bit stream, the second bit stream, the third bit stream, the fourth bit stream, the fifth bit stream.

15. The multi-channel sharing apparatus according to claim 14, wherein the receiving circuit further comprises:
a USB interface for receiving the first bit stream, the second bit stream, the third bit stream, the fourth bit stream and the fifth bit stream.

16. The multi-channel sharing apparatus according to claim 4, further comprising:
a splitter for distributing the third channel data to the companion chip.

17. The multi-channel sharing apparatus according to claim 16, wherein the companion chip further comprises a fifth processor interface, a third ISP and a fifth encoder, the third signal processor receives the third channel data via the fifth processor interface, the fifth encoder encodes the third channel data, which has been image processed by the third signal processor, as a fifth bit stream.

18. The multi-channel sharing apparatus according to claim 17, wherein the transmission circuit comprises:
a third processor interface for transmitting the first bit stream, the second bit stream, the third bit stream and the fourth bit stream to the receiving circuit;
a fourth processor interface for transmitting the fifth bit stream to the receiving circuit; and
a virtual channel controller, comprising:
a plurality of virtual channels via which the first bit stream, the second bit stream, the third bit stream and the fourth bit stream are transmitted to the third processor interface.

19. The multi-channel sharing apparatus according to claim 18, wherein the receiving circuit comprises:
a sixth processor interface for receiving the first bit stream, the second bit stream, the third bit stream and the fourth bit stream; and a seventh processor interface for receiving the fifth bit stream, wherein the network module outputs the third network package according to the fifth bit stream.

20. The multi-channel sharing apparatus according to claim 17, wherein the transmission circuit further comprises:
a universal serial bus (USB) controller for transmitting the first bit stream, the second bit stream, the third bit stream, the fourth bit stream and the fifth bit stream.

21. The multi-channel sharing apparatus according to claim 20, wherein the receiving circuit further comprises:
a USB interface for receiving the first bit stream, the second bit stream, the third bit stream, the fourth bit stream and the fifth bit stream.

22. The multi-channel sharing apparatus according to claim 1, further comprising:
a front camera for providing a first channel data; and
a back camera for providing a second channel data.

23. A multi-channel sharing method, comprising:
generating a first bit stream and a second bit stream according to a first channel data, and synchronically generating a third bit stream and a fourth bit stream according to a second channel data, wherein the resolution of the second bit stream is higher than that of the first bit stream, and the resolution of the fourth bit stream is higher than that of the third bit stream; and
outputting a first network package according to the second bit stream, and synchronically outputting a second network package according to the fourth bit stream.

* * * * *